Nov. 13, 1962  W. H. DOUGLASS ETAL  3,064,070
HERMETICALLY SEALED ELECTRICAL COMPONENT
Filed March 23, 1960
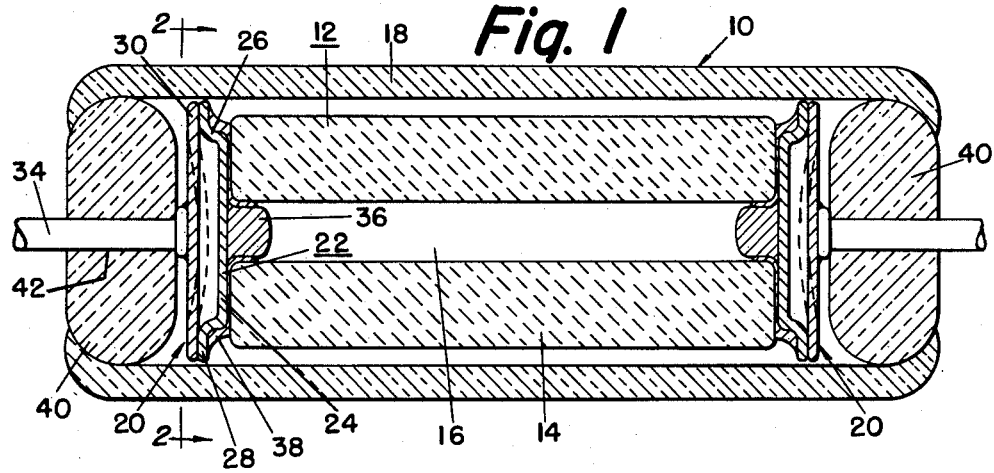
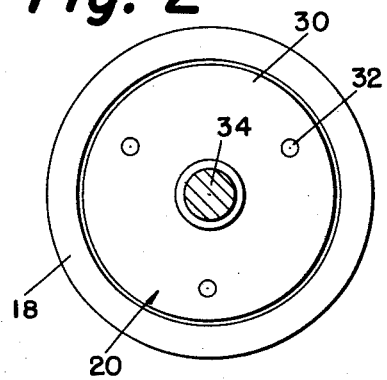
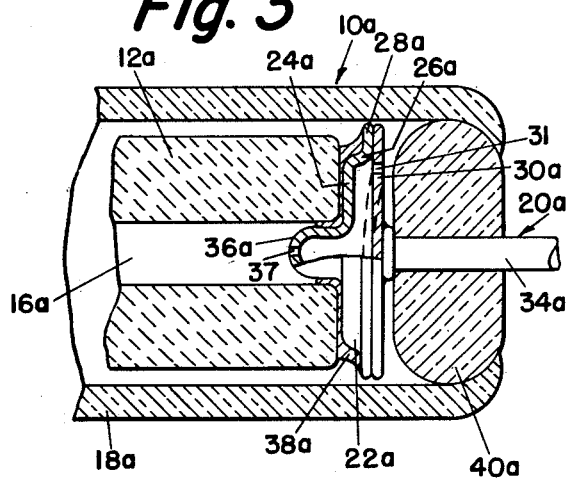
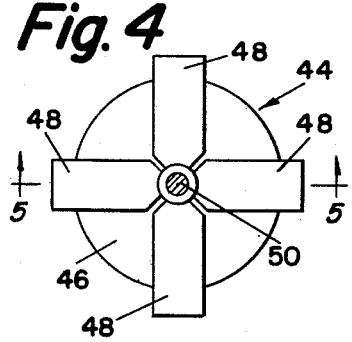
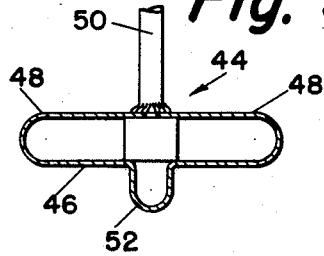
INVENTORS
WALTER H. DOUGLASS
BENJAMIN SOLOW
BY
Donald S. Cohen
ATTORNEY United States Patent Office 3,064,070
Patented Nov. 13, 1962

3,064,070
HERMETICALLY SEALED ELECTRICAL
COMPONENT
Walter H. Douglass, Oreland, Pa., and Benjamin Solow, North Hollywood, Calif., assignors to International Resistance Company, Philadelphia, Pa.
Filed Mar. 23, 1960, Ser. No. 16,994
10 Claims. (Cl. 174—52)

The present invention relates to a hermetically sealed electrical component, and more particularly to a terminal construction for a hermetically sealed electrical component.

A common method of hermetically sealing an electrical component, such as a resistor, capacitor, transistor, etc., which has been found to be acceptable is to place the component in a tube of glass, ceramic, plastic, or metal with the terminals of the component extending from the open ends of the tube. The open ends of the tube are then sealed by a plug of glass, ceramic, or plastic. The plugs extend around the terminals, and are sealed both to the tube and to the terminals. This completely encloses the component in the tube with the terminals projecting from the end plugs to permit the terminals to be connected in the desired circuit.

A major problem in sealing electrical components in this manner in a tube arises from the difference in the coefficients of expansion of the tube, the end plugs, the electrical component, and the terminals extending from the component through the end plugs. The differences between the coefficients of expansion of the various parts of the hermetically sealed component causes breakage of either the tube, the junction between the end plugs and the terminals or the tube, or the junction between the terminal and the component upon a major change in temperature of the unit. Thus, if the electrical component becomes heated during its use, as many electrical components do, such breakage would either cause the component to become electrically open, or would destroy the hermetic seal.

It is an object of the present invention to provide a novel hermetically sealed electrical component.

It is another object of the present invention to provide a novel terminal for a hermetically sealed electrical component.

It is still another object of the present invention to provide a terminal for a hermetically sealed electrical component which compensates for any differences in the coefficients of expansion of the various elements of the unit.

It is a further object of the present invention to provide a flexible terminal for a hermetically sealed electrical component.

Other objects will appear hereinafter.

For the purpose of illustration the invention there is shown in the drawings forms which are presently preferred; it being understood, however, that this invention is not limited to the precise arrangements and instrumentalities shown.

FIGURE 1 is a sectional view through a hermetically sealed electrical component of the present invention.

FIGURE 2 is a sectional view taken along line 2—2 of FIGURE 1.

FIGURE 3 is a sectional view of one end of a hermetically sealed electrical component having a modification of the terminal of the present invention.

FIGURE 4 is an end view of still another modification of the terminal of the present invention.

FIGURE 5 is a sectional view taken along line 5—5 of FIGURE 4.

Referring initially to FIGURE 1, the hermetically sealed electrical component of the present invention is generally designated as 10.

Hermetically sealed electrical component 10 comprises an electrical component 12 which may be a resistor, capacitor, transistor, etc. As shown, the electrical component 12 may be an electrical resistor which includes a cylindrical body 14 of an electrical insulating material having a central hole 16 extending longitudinally therethrough. The body 14 may be coated on its outer and end surfaces with a thin film of an electrical resistance material, such as carbon or a metal. The electrical component 12 is disposed within a cylindrical tube 18. As shown, the tube 18 is made of an electrically insulating glass or ceramic. However, the tube 18 may be of an insulating plastic or of a metal. If the tube 18 is made of a metal, the electrical component 12 is preferably coated or surrounded by an electrical insulating material to electrically insulate the component 12 from the metal tube.

Secured to each end of the component 12 is a terminal of the present invention which is generally designated as 20. Each of the terminals 20 comprises a metal cup 22 having a flat bottom 24, a cylindrical rim 26 extending from the edge of the bottom 24, and a flange 28 extending radially outwardly from the end of the rim 26. The flange 28 is in a plane which is spaced from, and substantially parallel to the plane of the bottom 24 of the cup 22. A flat plate 30 extends across the open end of the cup 22, and is seated against the flange 28 of the cup 22. Plate 30 is secured to the flange 28 of the cup 22 at circumferentially spaced points, such as by the welds 32 (see FIGURE 2). A terminal wire 34 is secured to the center of the outer surface of the plate 30, such as by welding or soldering. A cylindrical metal tip 36 is secured to the center of the outer surface of the bottom 24 of the cup 22.

Each of the terminals 20 is mounted at a separate end of the component 12 with the outer surface of the bottom 24 of the cup 22 seated against the end of the body 14, and the tip 36 extending into the hole 16 in the body 14. Each of the terminals 20 is secured to the component 12 by an electrically conductive cement or solder 38. The tip 36 of the terminal 20 serves to center the terminal 20 on the end of the component 12. However, if desired, the terminal 20 may be made without the tip 36, especially if the component 12 does not have a central hole in its ends. The terminal wire 34 of the terminal 20 is of a length to project from the end of the tube 18. The cup 22, plate 30, and terminal wire 34 of the terminal 20 are made of an electrically conductive metal so that the terminal 20 will serve to electrically connect the component 12 to an electrical circuit.

Each end of the tube 18 is closed by a plug 40 which fits into the end of the tube 18. Each of the plugs 40 has a central hole 42 therethrough through which the terminal wire 34 of the terminal 20 extends. The plugs 40 are sealed to the terminal wires 34, and to the inner surface of the tube 18. As shown, the plugs 40 are made of glass, and the tube 18 is sealed to the plugs 40 by fusing the ends of the tube 18 around and to the plugs 40. The plugs 40 may also have a fused junction to the terminal wires 34. However, the plugs 40 may also be made of a ceramic or a plastic, and may be hermetically sealed to the terminal wires 34 and the tube 18 by any method well known in the art for sealing the particular material of the plugs 40 to the materials of the tube 18 and the terminal wires 34. The plugs 40 not only hermetically seal the ends of the tube 18, but also mechanically secure the electrical component 12 within the tube 18.

In the use of the hermetically sealed component 10 of the present invention, a change in the temperature of the unit may cause the terminal wires 34 of the terminals 20 to pull away or move toward the ends of the component 12 because of the differences in the coefficients of expansion of the tube 18, the electrical component 12, and the plugs 40. Such movement of the terminal wires 34 is permitted by te flexing of the plate 30 of each of the terminals 20. Thus, if the electrical component 12 expands longitudinally more than the tube 18, the plates 30 of the terminals 20 will flex inwardly as indicated by the dotted lines in FIGURE 1. If the tube 18 expands longitudinally more than the electrical component 12, the plates 30 of the terminals 20 will flex outwardly. Thus, the flexing of the plates 30 of the terminals 20 take up any differences in expansion or contraction of the various elements of the hermetically sealed component 10, and thereby prevent breaking of either the tube 18, the junction between the tube 18 and the plugs, the junction between the plugs 40 and the terminal wires 34, or the junction between the terminals 20 and the electrical component 12. Thus, using the flexible terminals 20 of the present invention, the electrical component 12 can be hermetically sealed in a tube 18 of a material having a different coefficient of expansion than that of the electrical component without any danger that the hermetically sealed unit, the hermetically sealed joints of the unit, or the electrical connections to the electrical component will be damaged by the differences in the coefficient of expansion.

Referring to FIGURE 3, there is shown a hermetically sealed unit 10a which utilizes a modification of the terminal of the present invention, which is generally designated as 20a. Terminal 20a comprises a metal cup 22a having a flat bottom 24a, a cylindrical rim 26a projecting from the periphery of the flat bottom 24a, and a flange 28a extending radially outwardly from the end of the rim 26a. The flange 28a is in a plane spaced from, but substantially parallel to the plane of the bottom 24a. The bottom 24a of the cup 22a is provided with a central projection forming the tip 36a which is integral with the cup 22a. The tip 36a has a small hole 37 therethrough. A metal plate 30a extends across the open end of the cup 22a, and is in mating engagement with the flange 28a. The plate 30a is secured to the flange 28a of the cup 22a at a plurality of circumferentially spaced points, such as by welding. The plate 30a has a small hole 31 therethrough. A metal terminal wire 34a is secured to the center of the outer surface of the plate 30a. By making the tip 36a an integral part of the cup 22a, the terminal 20a of the present invention is easier and less expensive to manufacture.

The terminal 20a is mounted on the end of an electrical component 12a with the bottom 24a of the cup 22a seated against the end of the component 12a, and the tip 36a extending into the hole 16a in the component 12a to center the terminal 20a on the end of the component 12a. The terminal 20a is electrically and mechanically secured to the component 12a by an electrically conductive cement or solder 38a. The electrical component 12a and the terminals 20a (only one of which is shown) are mounted in a tube 18a with the terminal wires 34a projecting from the ends of the tube 18a. A sealing plug 40a is mounted in each end of the tube 18a, and surrounds the terminal wire 34a of a terminal 20a. The plugs 40a are hermetically sealed to the tube 18a and to the terminal wire 34a so as to hermetically enclose the component 12a within the tube 18a. In the use of the hermetically sealed unit 10a, the plate 30a of the terminal 20a flexes in the same manner as previously described with regard to the terminal 20 to compensate for any differences in the coefficients of expansion of the various elements of the unit 10a.

In the hermetic sealing of the unit 10a, the tube 18a is often either evacuated or filled with an inert gas. When the air in the tube 18a is removed either for evacuating the tube or for replacing the air with an inert gas, the air within the hole 16a in the component 12a must also be removed. If the air in the hole 16a is not removed the air may later leak from the hole 16a into the tube 18a and thereby contaminate the component 12a. Also, the pressure of the air in the hole 16a, which would be higher than the pressure in the evacuated tube 18a, may break the connection between the terminal and the component 12a. However, with the terminal 20a of the present invention, the air in the hole 16a is removed through the holes 37 and 31 in the tip 36a and plate 30a respectively when the tube 18a is evacuated. Instead of providing the plate 30a with the hole 31 to permit the air to pass therethrough, an edge of the plate 30a may be cut away to expose the inside of the cup 22a.

Referring to FIGURES 4 and 5, another modification of the terminal of the present invention is generally designated as 44. Terminal 44 comprises a flat metal base plate 46 having four arms 48 integral with and extending from the periphery of the base plate 46. The arms 48 are uniformly spaced around the periphery of the base plate 46. Each of the arms 48 is bent back over the base plate 46, and extends radially along the base plate. The bent back portions of the arms 48 are all in the same plane which is spaced from and substantially parallel to the base plate 46. The ends of the arms 48 meet at substantially a common point which is over the center of the base plate 46. A metal terminal wire 50 is secured to the ends of the arms 48, either by a butt weld or by soldering, and the terminal wire 50 extends axially away from the base plate 46. Thus, the ends of the arms 48 are joined together by the terminal wire 50. As shown in FIGURE 5, the base plate 46 has a projection in its center which extends away from the terminal wire 50 and which provides the tip 52.

The terminal 44 of the present invention is mounted on an electrical component in the same manner as previously described with regard to the terminals 20 and 20a of FIGURES 1 and 3. In the use of the terminal 44, the arms 48 will flex to permit the terminal to accommodate any variations in expansion or contraction of the various elements of the hermetically sealed unit. Although the terminal 44 is shown as having four of the arms 48, the terminal 44 may be provided with any desired number of the flexible arms 48.

Although the electrical component of the hermetically sealed units of the present invention are shown having a flexible terminal of the present invention secured to each end thereof with the terminal wires extending from opposite ends of the tube, it should be understood that the flexible terminals of the present invention may also be used on components having all of the terminals at one end of side thereof with the terminal wires all projecting through the same end or side of the tube or casing in which the component is sealed.

The present invention may be embodied in other specific forms without departing from the spirit or essential attributes thereof, and, accordingly, reference should be made to the appended claims, rather than to the foregoing specification as indicating the scope of the invention.

We claim:
1. In a hermetically sealed electrical unit in which an electrical component is enclosed within a casing, said electrical component having an opening in a surface thereof, a terminal secured to said surface of the component, said terminal comprising a base member having a tip extending therefrom, a flexible member extending across said base member, said flexible member being secured at an edge directly to the base member, and a terminal wire secured to said flexible member and extending away from said base member, the base member of said terminal being secured to said surface of the electrical component with the tip extending into the opening in said surface and the terminal wire projecting through and secured to the casing.

2. A hermetically sealed electrical unit in accordance with claim 1 in which the tip is an integral projection on the base member.

3. In a hermetically sealed electrical unit in which an electrical component is enclosed within a casing, a terminal secured to said component, said terminal comprising a metal cup having a flat bottom, a cylindrical rim and flange extending radially outwardly from said rim, said flange being in a plane spaced from and substantially parallel to the bottom, a flat metal plate extending across the open end of the cup and seated against the flange of the cup, said plate being secured to the flange, and a metal terminal wire secured to and extending from the outer surface of said plate, the bottom of said terminal being seated against and secured to the electrical component and the terminal wire projecting from and secured to the casing.

4. A hermetically sealed electrical unit in accordance with claim 3 in which the plate is secured to the flange of the cup at a plurality of circumferentially spaced points.

5. A hermetically sealed electrical unit in accordance with claim 3 including a tip extending from the outer surface of the bottom away from the plate, and the electrical component having an opening therein into which the tip extends.

6. A hermetically sealed electrical unit in accordance with claim 5 in which the tip is an integral projection on the bottom of the cup.

7. In a hermetically sealed electrical unit in which an electrical component is enclosed within a casing, a terminal secured to said component, said terminal comprising a flat metal base plate, a plurality of arms integral with and extending from the edge of the base plate, said arms being bent back over the base plate and lying in a plane spaced from and substantially parallel to said base plate, the ends of said arms meeting at a point over the center of the base plate, and a metal terminal wire secured to the ends of the arms and extending away from the base plate, the base plate of said terminal being secured to the electrical component and the terminal wire projecting from and secured to the casing.

8. A hermetically sealed electrical unit in accordance with claim 7 in which the base plate of the terminal has a projection therein extending away from the arms, and the electrical component has an opening therein into which the projection extends.

9. A terminal for an electrical component comprising a flat metal base plate, a plurality of arms integral with and extending from the edge of the base plate, said arms being bent back over the base plate and lying in a plane spaced from and substantially parallel to said base plate, the ends of said arms meeting at a point over the center of the base plate, and a metal terminal wire secured to the ends of the arms and extending away from the base plate.

10. A terminal in accordance with claim 9 in which the base plate has a projection therein extending away from the arms.

References Cited in the file of this patent

UNITED STATES PATENTS

| | | |
|---|---|---|
| 731,959 | Sheer | June 23, 1903 |
| 2,101,896 | Burlingame | Dec. 14, 1937 |
| 2,289,249 | Deigel | July 7, 1942 |
| 2,558,878 | Richardson | July 3, 1951 |
| 2,905,873 | Ollendorf et al. | Sept. 22, 1959 |
| 2,921,113 | Clemons | Jan. 12, 1960 |
| 2,934,588 | Ronci | Apr. 26, 1960 |